United States Patent [19]
Hluchan et al.

[11] 3,779,075
[45] Dec. 18, 1973

[54] AIR-DATA INSTRUMENT AND METHOD

[75] Inventors: Stephen Andrew Hluchan; Leland B. Tainter, Jr., both of Riverside, Calif.

[73] Assignee: Bourns, Inc., Riverside, Calif.

[22] Filed: June 21, 1971

[21] Appl. No.: 154,966

[52] U.S. Cl. .................................. 73/182, 73/386
[51] Int. Cl. .................. G01c 21/10, G01l 7/12
[58] Field of Search ............. 73/182, 384, 386, 73/387, 410, 406, 181; 338/41, 42

[56] References Cited
UNITED STATES PATENTS
| | | | |
|---|---|---|---|
| 3,537,308 | 11/1970 | Darlington | 73/386 |
| 3,625,116 | 12/1971 | Hluchan | 73/406 |
| 2,886,679 | 5/1959 | Jonke | 338/41 |

*Primary Examiner*—Donald O. Woodiel
*Attorney*—William G. Becker

[57] ABSTRACT

Means and method for sensing one or more sets of variable atmospheric and reference pressure phenomena and producing therefrom one or more sets of signals a first of which signals of all such sets represents directly and linearly the variation of a respective physical quantity selected from among airspeed and altitude and the second of which signals of all such sets represents directly the mn th power of the respective pressure phenomena sensed, and for electrically deriving from such signals a value of a dimensionless number commonly referred to as Mach number.

7 Claims, 7 Drawing Figures

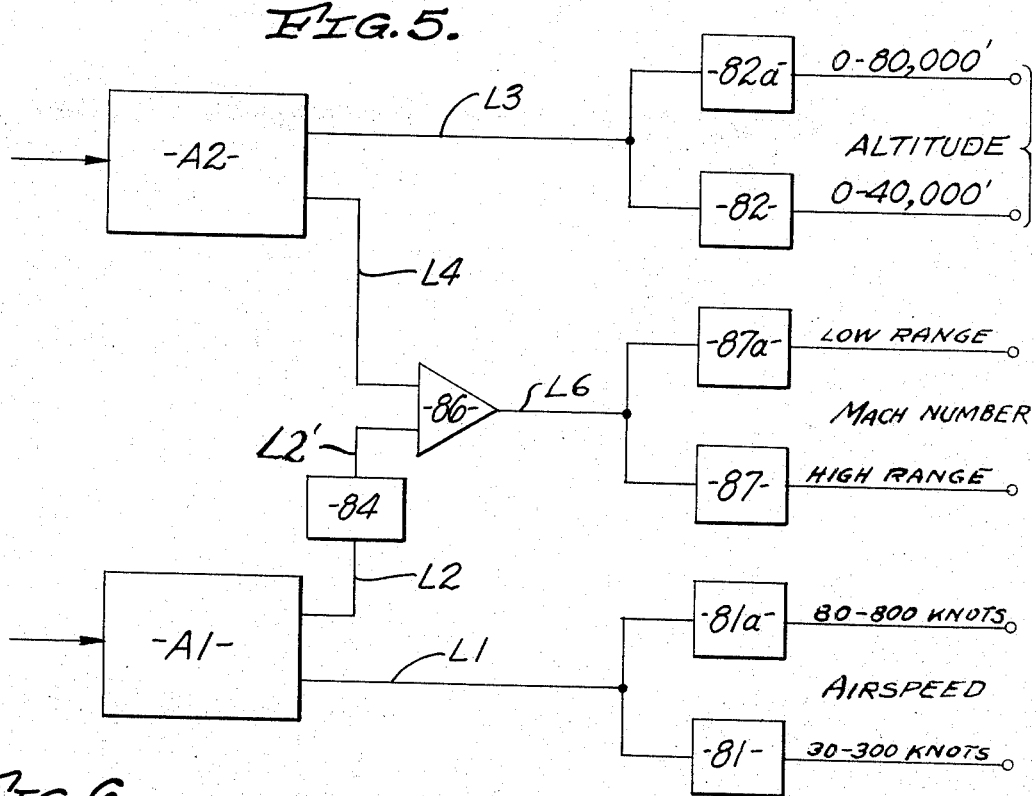
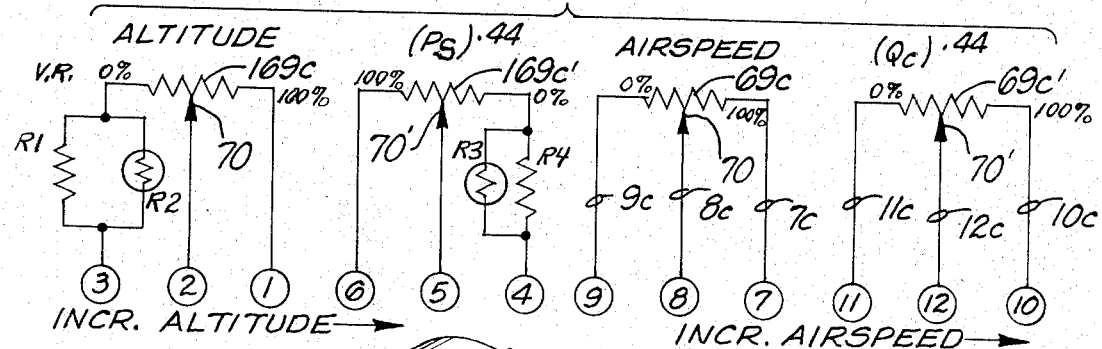
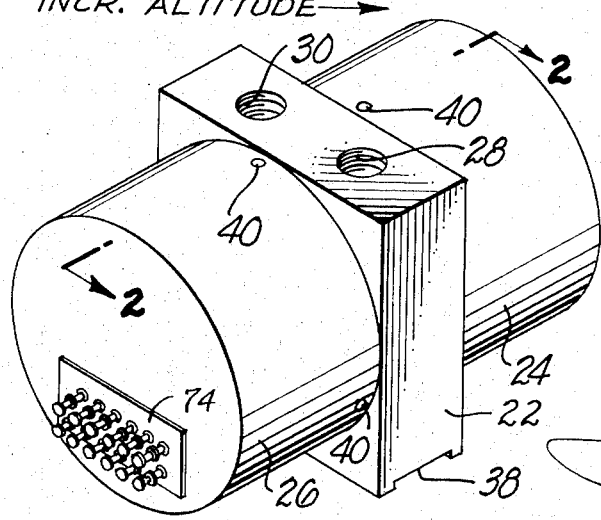
INVENTORS
STEPHEN A. HLUCHAN,
LELAND B. TAINTER, JR.

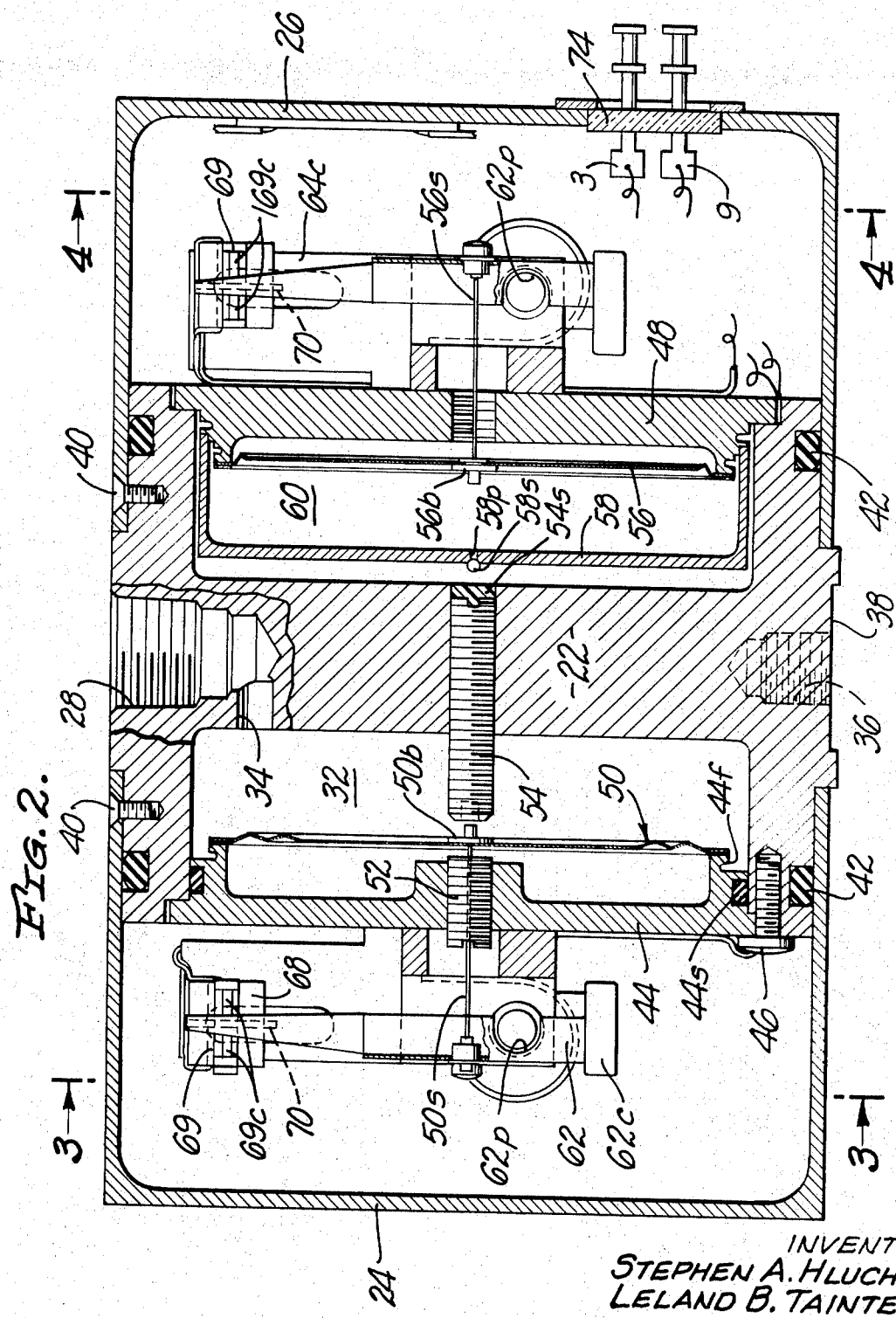

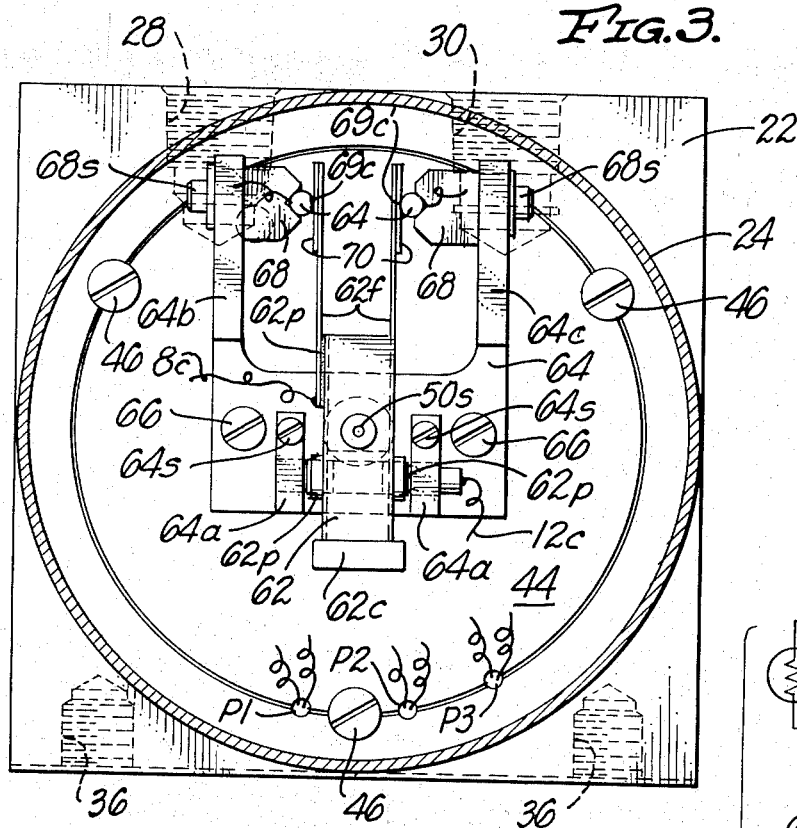
FIG.3.
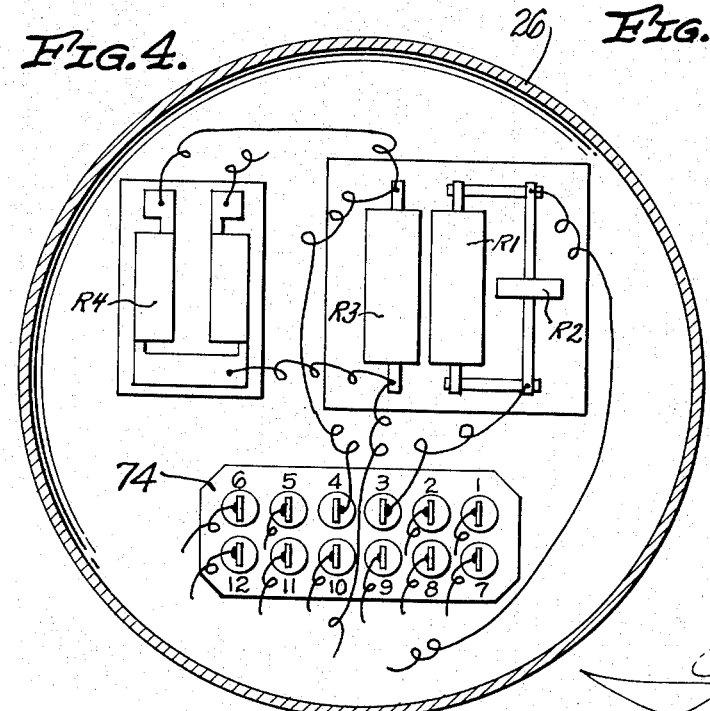
FIG.4.
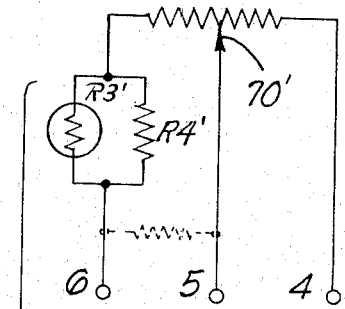
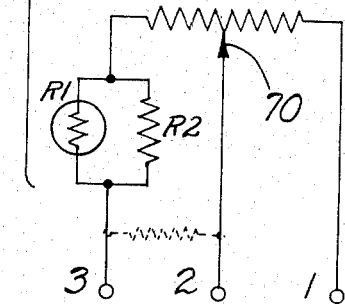
FIG.7.
INVENTORS
STEPHEN A. HLUCHAN,
LELAND B. TAINTER, JR.

AIR-DATA INSTRUMENT AND METHOD

BRIEF SUMMARY OF THE INVENTION

1. The prior art and environment of the invention.

Utilization of devices sensitive to change of pressure of fluid acting thereon, such as evacuated capsules, flexible diaphragms and bourdon tubes, to actuate means for presenting or providing an indication of change of a physical quantity such as altitude or airspeed, has been practiced at least since the advent of the aneroid barometer. Utilization of differential-pressure sensitive means, such as flexible diaphragms to the opposed faces of which the static and ram pressures are applied, for actuating means providing an indication of speed through the atmosphere, has similarly been commonly practiced. In previous aircraft instrumentation for indication and/or use of airspeed and altitude at ordinary speeds and altitudes, e.g., at less than 325 knots and 10,000 meters, the instruments commonly included scaled dial members about which a needle was caused to move by action of the diaphragm to provide visual indications of those variable physical quantities. Later, instruments were developed in which movement of the pressure-sensitive device or member, usually a diaphragm, actuated a potentiometer or the like, the variable potential output was used in an electrical meter, such as a milliammeter, to provide such visual indications. Inaccuracies due to fluctuations of local atmosphereic pressure and temperature were quite generally ignored or compensated to some extent by adjustment of the pressure-sensitive instrument or the potentiometric means in the indicator circuit; and at lower and medium flight altitudes and at speeds considerably below sonic speed the inaccuracies were tolerable. With the advent of remotely-controlled flights at extreme flight altitudes and at nearsonic to supersonic speeds, the noted indications are inadequate for providing an adequate or desired exactitude of flight control.

2. The present invention.

In most elementary aspect or form the present invention comprehends means such as a pressure-sensitive diaphragm to which are applied fluid pressures such as variable static and dynamic pressures of the ambient air, or variable static and ambient pressure and a fixed reference pressure of very low value, and which diaphragm is thereby variably deformed by the differential pressure such that the deformation is non-linear relative to the variation of the differential pressure but is substantially linear relative to a variable physical quantity, such as altitude or airspeed, an indication of the instant value of the physical quantity being a principal desired end result. In a more extensive form or aspect, the invention comprises translational and/or transducer means coupled to the previously-mentioned pressure-sensitive means and constructed and arranged to convert the mechanical deformation or displacement of the pressure-sensitive means into an electrical signal, such as electric potential or voltage, that is a variable signal the variations of which follow non-linearly the variations of the sensed differential pressure but follow substantially linearly the corresponding variations of the physical quantity of interest such as altitude or airspeed. In a still further extended physical embodiment of the invention, the noted translational or transducer means is constructed and arranged to produce two concurrent variable electric signals, hereinafter at times termed first and second primary signals, the first of which is that previously mentioned as representing a linear indication of variation of the physical quantity, and the second of which is accurately representative of the variation of the sensed pressure to a specified exponential power mn which may in particular example hereinafter explained be taken as $m = 1$ and $n = 0.44$. As will be made evident hereinafter, such a functional electric signal is useful in automatic derivation of dimensionless physical values, for example Mach number. The latter value is of extreme importance in flight control and other operations relating to aircraft flight at both low and high speeds and both at low and high altitudes. A still further extension of the aspects of the invention involves the combination of two of the aforementioned more elementary arrangements, in which combination a first such pressure-sensitive device with its signaling transducer adjuncts is arranged and constructed to provide a first primary electric signal changing linearly with changing altitude and a concurrent second primary electric signal changing according to the mn th power of the absolute pressure sensed, and a second such pressure-sensitive device with its signaling transducer adjuncts is arranged and constructed to provide first and second concurrent secondary electric signals the variation of the first of which represents linearly the change or variation of airspeed and the second of which varies in accord with the mn th power of the pressure differential sensed, whereby direct signal-representations of airspeed and of altitude are available for indicating current values of those two variable physical quantities and whereby, with an additional adjunct in the form of a functional operational circuit means such as operational amplifier means, an output signal representative of Mach number or a like dimensionless physical quantity is produced. Thus in a most specific aspect, the invention provides means including two pressure-sensitive means, a first sensing ambient absolute pressure and the second sensing differential pressure relative to static and pitot pressure at the same location, and respective translating or transducing means, and adjunct circuit means, permitting the direct and concurrent electrical representation of airspeed, altitude, and Mach number. In that most specific aspect, each of the two pressure-sensitive means is arranged to actuate first and second primary and first and second secondary electrical signal-producing means, herein shown as potentiometric transducers.

The most specific aspect of the invention comprises the more elementary aspects as indicated, and such most specific aspect is illustrated, in a presently preferred but exemplary form, in the appended drawings forming a part of this specification.

DESCRIPTION OF THE DRAWINGS

In the drawings,

FIG. 1 is a pictorial view of the housing and mounting structure in and upon which the pressure-sensitive devices and certain of the electrical components of the exemplary embodiment are mounted, showing ports through which fluids under ambient static and pitot pressures are permitted ingress into and egress from respective regions in the housing structure, to no specific scale;

FIG. 2 is a longitudinal sectional view, taken as indicated by directors 2—2 in FIG. 1, to a larger scale, showing the internal arrangement of components in the housing, and other structural details;

FIGS. 3 and 4 are transverse sectional views of structure partly shown in section in FIG. 2, the sections having been taken as indicated as indicated by directors 3—3 and 4—4, respectively, in FIG. 2, minor parts or portions having been removed;

FIG. 5 is a functional schematic block diagram illustrating the functional relationships among mechanical, electrical, and electronic-circuit components of the exemplary preferred embodiment of the invention;

FIG. 6 is a composite circuit diagram of corrected and non-corrected potentiometric pairs comprised in the circuit means housed in the housing depicted in FIG. 1 and functionally indicated in FIG. 5; and FIG. 7 is a composite schematic illustrating certain preferred temperature-correction means and techniques employed in the exemplary apparatus of the invention.

DETAILED DESCRIPTION OF THE INVENTION WITH REFERENCES TO THE DRAWINGS

In FIG. 1 the instrument, 20, which may optionally include all of the functional means indicated in FIG. 5 but preferably and as herein described excludes certain of those means which may better be more readily available for adjustment, etc., externally of the housing means, is illustrated as comprising a central machined support means or frame 22 to which are mounted end caps 24 and 26 which with the frame constitute the instrument housing means. The support means is provided with fluid ports 28 and 30 for connection to sources of fluid under pressure. For example, port 28 provides a fluid passage (FIG. 2) into a chamber 32 via a bore 34, for ingress and egress of fluid under ram pressure. Similary, port 30 provides a passage for fluid under ambient static pressure, into the end chambers of the instrument inside caps 24 and 26, by way of bores (not shown) through the flange portions of the frame 22.

Also as indicated in FIG. 2, means in the form of drilled and tapped screw-receiving holes such as 36 and a shallow slot 38 are provided for attaching the instrument to other means such as a fixed portion of an aircraft frame. The flange portions of the means 22 (herein generally designated a frame) are made of circular exterior form for reception of the respective end caps, and the caps are secured thereto as by screw means 40. The end chambers are sealed as by resilient seal rings 42.

Fitted into a stepped recess in a first end of frame 22 (FIG. 2) and supported by the latter is a first transducer assembly comprising a shaped circular plate-like support 44. The latter is firmly secured to frame 22 as by screw means 46. Similarly fitted in and affixed to the second end of frame 22 is a second transducer assembly which comprises a somewhat different second plate-like support 48 which is similarly affixed to the frame by screw means (not shown).

Welded to the periphery of an outstanding rim flange 44f of support 44 (FIG. 2) and forming at that periphery a gas-tight juncture is a special first resilient diaphragm 50. The diaphragm, in conjunction with a ring seal 44s and inner wall portions of frame 22, provides the aforementioned chamber 32 into which fluid passage 34 opens from port 28. Thus the pressure differential between the fluid in port 28 and that in port 30, or that in chamber 32 and in the region within end cap 24, is sensed by diaphragm 50. The latter is carefully formed with annular conical corrugations, as distinguished from undulatory corrugations, next adjacent to the periphery, and with a large flat circular central portion to the center of which a transmitter button 50b is brazed, all as indicated in FIG. 2. The dimensions and forms of the individual conical surfaces of the corrugations are carefully produced, relative to the dimension of the circular flat central portion, so that as the pressure differential increases at approximately a square root increasing rate of change as airspeed, for example, increases, the transmitter button moves substantially equal extents in response to equal respective increases in airspeed. Thus the diaphragm, contrary to the usual action in an airspeed indicator, elastically deforms non-linearly relative to change or variation of the differential pressure to which it is subjected during increase or decrease in airspeed, and deforms linearly relative to the latter physical quantity. The transmitter button 50b has securely affixed thereto a transmitter strut 50s for connecting the button to transducer means presently fully described and which transducer means are effective to translate the translatory movement of the transmitter into a set of electrical signals one of which is linearly representative of the change of the noted physical quantity and the other is representative of the $m n$th power of the differential pressure sensed by the diaphragm. To prevent excessive travel of the transmitter button, adjustable stops 52 and 54 are provided. Stop 52 is provided with an axial bore, through which the transmitter strut 50s extends free of any contact with the stop. Stop 52 is threaded as indicated as is turned in a tapped bore in support 44. Stop 54 is similarly threaded and is turned in a tapped hole in frame 22 and is sealed therein, as by self-setting sealing resin 54s.

A second, and somewhat similar circular pressure-sensitive diaphragm 56 has its peripheral edge welded and sealed to an annular flange of the second support means, 48, as indicated in FIG. 2. Similarly, the second diaphragm has an annular outer portion annularly corrugated with conical surfaces of opposite inclination relative to an axis perpendicular to the general plane of the diaphragm. The diaphragm 56 similarly is formed with a large circular central flat portion encircled by the annular corrugated portion, and bears at its center a securely attached gas-tight transmitter button 56b to which the end of a transmitter strut 56s is securely affixed as by welding. Also secured and sealed to the outer peripheral flange of support 48 is a rigid strong cup-like cell cap 58 having a small hole or port 58p permitting evacuation or pressurizing the cell 60 to a desired pressure and subsequent sealing by a ball seal 58s which is adapted to be fusion-united to the cap to seal port 58s in a known manner. Thus a fluid-tight cell is provided in which fluid under a reference pressure is maintained captive. It will be evident that the reference pressure may be of very low order, and in the presently explained specific example the reference pressure is 10–15 microns of Hg pressure, that is, a value near zero pressure, whereby the diaphragm 58 may in this instance be said to sense absolute pressure.

The construction of diaphragm 56, with an outer periphery firmly anchored and sealed to a rigid support and an outer annular corrugated portion comprising oppositely-directed conical portions merging at a potentiometers are diagrammatically portrayed in FIG. 6, connected to terminal sets 9, 8, 7 and 11, 12, 10 respectively, by conductor sets 9c, 8c, 7c and 11c, 12c, 10c, as indicated. The conductors, shown largely broken away, extend from the named components to respective insulated terminals mounted on a header 74 (FIG. 2) sealed in an aperture formed in cap 26; two of the terminals, 3 and 9, being shown in FIG. 2 and the entire group of such terminals being shown in FIG. 4. The insulated conductors extend from the chanber inside cap 24, through passages such as P1, P2 and P3 (FIG. 3) formed through supports 44 and 48 and frame 22, into the chamber inside cap 26, and are at their other extremities soldered or brazed to the respective terminals.

Situated in the chamber closed by cap 26 (FIG. 2) is a second dual potentiometric unit identical to that previously described and located in cap 24, with minor differences as will be explained. The transmitter 56s is attached to the second potentiometric unit as indicated, for actuation incident to the variations of the pressure phenomena sensed by diaphragm 56. Structurally, the arrangement and components are like or similar to those previously described, but resistance values and other electrical characteristics of the two resistance elements, one of which is shown at 169c in FIG. 2, may differ from those of the previously enumerated elements; and further, the sets of insulated conductors, one set for each of the two contacts 70 and 71 and associated elements, extend along the outer surface of support 48 and the wall of cap 26, to respective ones of the terminals in heater 74. In general, the conductors are affixed to fixed components such as the supports and caps, to the extent that is feasible, as by cement, adhesive or ties, whereby to avoid damage or interference during operation of the instrument.

The preceding description and explanation of the mechanical portions of the invention makes evident the provision of a primary pressure-sensitive means including diaphragm 50 which actuates a translating means including transmitter 50s which provides a mechanical signal of the nature of translational movements that are non-linearly related to variations of sensed pressure differential but are substantially linearly related to variation of a physical quantity which in this example is airspeed, and which mechanical signal is translated by the dual potentiometric unit including lever 62 and elements 69c and 69c' into first and second primary electrical signals made evident at the terminals connected to the noted elements and the corresponding contacts 70. Further, it is made evident that in a similar way and by a similar second pressure-sensitive means including diaphragm 56 a secondary mechanical signal is generated in response to variations in the pressure phenomena sensed, that the secondary mechanical signal is nonlinearly related to the variations sensed but is linearly related to concurrent variations of a second physical quantity which in this example is altitude above a datum level, and that the mechanical signal is translated by the second potentiometric apparatus into first and second secondary electrical signals made apparent at the two sets of terminals 3, 2, 1 and 6, 5, 4 respectively. In the case of each resistance element of the two sets thereof, it is assumed that electric potential is supplied thereto, in manners and by means known in the art.

The electric signals derived from the previously described components are utilized to produce, directly, indications of the two noted physical quantities of interest, such as airspeed and altitude, and to produce indirectly an indication of the instant value of a dimensionless number, such as Mach number, that is useful in vehicle control and/or monitoring. As has been made evident, if ports 28 and 30 are connected to the dynamic and static air pressure ports of a static/pitot tube installed in an aerial vehicle in normal attitude, the primary mechanical signal will linearly follow change of airspeed of the craft. One of the two primary electric signals produced by the first or primary potentiometric means is accordingly made to follow linearly the primary mechanical signal, that is, movements of transmitter 50s, and hence to be a linear electrical analog of airspeed. Thus the first resistance element is made to be as linear as is practicable. The other, or second, primary electric signal, produced concurrently with the first, is desired to be combined with the second secondary electric signal that is produced by the other potentiometric means of the instrument, in accord with a mathematical relationship between the pressure-differences to which the respective diaphragms are subjected. The mathematical relationship represents the value of Mach number, and is algebrically expressed by relation $M = K (Qc/Ps)^{mn}$ wherein $M$ represents Mach number, $K$ is a constant which for the exemplary embodiment is taken equal to 1.06, $m$ and $n$ are constants which for the exemplary embodiment are taken as a product equal to 0.44, $Qc$ is the differential pressure sensed by diaphragm 50, and $Ps$ is the substantially absolute pressure sensed by diaphragm 56.

To translate the mechanical movements of transmitters 50s and 56s, which movements as explained are non-linear relative to variations of pressure differential and absolute pressure sensed by the diaphragms, into electric signals representing the $mn$ th power of the pressure phenomena sensed by the respective diaphragms, the second potentiometer element of each of the potentiometric transducers is made non-linear, either by production of an initially patterned element, or by trimming a linear element, whereby the output of the potentiometer is made to follow the $mn$th power of the associated respective pressure phenomenon sensed by the corresponding diaphragm. The latter mode of causing the second signals of the two transducer units to be non-linear is preferred and is used in the illustrated exemplary instrument. Thus the second resistance element of each of the sets thereof is trimmed, as by automatic laser trimming means or manually manipulated means such as air-abrasive brush means or buffing means, so that the electric potential signal output from the element-contact combination overcomes or corrects for the linear following of the variation of the physical quantity of interest and further and concurrently follows the $mn$th exponential function of the actual pressure-difference sensed by the respective diaphragm. The two sets of potentiometer circuits are schematically shown in FIG. 6. As there indicated the first and second wipers or contacts 70 and 70' comprised in the primary transducer unit actuated through the intermediate transmitter 50s by the pressure-sensitive diaphragm 50, are connected to terminals 8 and 12 respectively, while the linear element 69c has its end terminations connected to terminals 9 and 7 and the non-linear or "trimmed" element 69c' has its end sharply-defined circular line of juncture, is such that with cell 60 evacuated to a low vacuum as described and with fluid under ambient static pressure admitted into the interior of cap 26 via port 30, variations in the latter pressure as sensed by the diaphragm are converted or translated into rectilinear movements of button 56b and strut 56s that are non-linearly related to the respective pressure variations but are linearly related to changes of altitude, one of the principal physical quantities or measures of interest in the exemplary illustrated embodiment of the invention.

The changes or variations of sensed pressures, which in this example are the pressure differential between static and dynamic or ram pressure due to the velocity through the atmosphere in the case of diaphragm 50, and absolute pressure exhibited by the static ambient atmosphere in the case of diaphragm 56, are converted or translated by the respective diaphragms into respective mechanical signals or translatory movements of the respective transmitters 50s and 56s. Such mechanical movements or signals are, due to the particular configuration and dimensional relationships of the diaphragms, unusual in that they are not linear relative to the respective pressure variations sensed, but are, rather, substantially linearly related to the two variable physical qualtities of interest. The latter, in the illustrated embodiment of the invention, are airspeed in the case of transmitter 50s and altitude in the case of transmitter 56s.

In accord with the invention, mechanical signals or movements of the two transmitters are utilized individually to provide respective signals directly representative of the two noted variable physical quantities, and are further utilized in combination to provide an electrical signal directly representative of a dimensionless number that is of unique value in effecting and monitoring control of aerial vehicles traveling through the atmosphere. The value of the latter number, which in the illustrated form of the invention is Mach number, is especially of value and merit in the case of vehicles moving at high altitudes and/or high airspeeds. To facilitate transmission of the derived signals to locations remote from the physical instrument and to facilitate the noted combination of a second signal of each of the sets of the signals in accord with a specific mathematical relationship for derivation or production of a signal representing the noted dimensionless number, the mechanical signals constituted by movements of the transmitters 50s and 56s are changed into respective sets of electrical signals. A first electric signal of each set, that is, a first signal of the primary set and of the secondary set, is derived or produced, as by mechanical-to-electrical transducer means, to be linearly representative of the extents of the mechanical movements of the corresponding transmitter and hence of the variations of the corresponding physical quantity, while the second electric signal of each of the primary and secondary sets is concurrently or contemporaneously derived or produced to represent the mn th power of the signal representing the respective pressure phenomenon sensed by the diaphragm. The latter pair of electric signals, one from each set, are conveyed or transmitted to active circuit means which are specially designed and constructed to perform, electrically and automatically, mathematical operations to provide an output directly representative of Mach number.

The mentioned conversion of movements or mechanical signals of transmitter 50s into first and second electric signals of a primary set thereof, and of such mechanical signals of transmitter 56s into first and second electrical signals of a secondary set of such signals, are performed by first and second transducer units, respectively. Except in respect of details of resistive elements which will be explained hereinafter, the transducer units are alike in structural details and hence only that one connected to transmitter 50s will be described, and like components in the two units will be denoted by like numerals.

Referring to FIGS. 2 and 3, the outer end of transmitter 50s is firmly secured to a counterweighted lever 62 that is mounted by crossed leaf-spring flexural pivots 62p is a doubly bifurcate bracket 64 that in turn is affixed to support 44 by means such as screws 66. The flexural pivots are anchored at their fixed outer ends in respective outstanding limbs 64a of bracket 44 by clamping screw means such as 64s, and are affixed at their inner ends in a complementary recess formed in lever 62, as by soldering. Thus the lever is mounted for limited rotational or rocking movement about an axis defined by the flexural pivots, and is rocked in response to mechanical signals or movements of transducer 50s. Upstanding limbs 64b and 64c of bracket 64 have affixed thereto respective insulation element pads such as 68, as by means of screws 68s. Each of the pads supports a respective resistance element mandrel such as 69 preferably constructed as a glass rod, bearing a respective one of longitudinal stripe-like adherent resistance elements 69c formed of resistive composition such as is commonly employed in the manufacture of composition-element variable resistors. The elements are preferably secured to pads 68 by adhesive means, and the pads are preferably adjustable parallel to the axes of the elements by means of slots formed in limbs 64b and 64c for accommodation of the screws 68s.

The lever 62 has at its lower end a counterweight means 62c of known form, provided for minimization of diaphragm (sensor) and lever unbalance. The lever carries at one side (as seen in FIG. 3) an insulative pad 62p on which is mounted one of a pair of contact fingers 62f. The second of the contact fingers is formed integral with the other side of the lever and is thus conductively connected to the lever. Adhesive means are preferably employed to secure the insulated contact finger to the lever, but rivet means (not shown) may be employed. Each of the contact fingers has conductively secured thereto a wiper or contact 70 preferably of precious metal alloy such as that sold under the registered trade name NEY-ORO-G, and which contact is pressed resiliently against the surface of a respective one of the resistance elements 69c by resilience of the respective spring finger. Each of the ends of the resistance elements is provided with a conductive terminal, and an insulated conductor lead, as in conventional potentiometer construction practices. Also the lever is electrically connected to an insulated conductor 12c (FIG. 3), by way of the flexural pivot 62p and the insulated finger 62f has soldered thereto the end of an insulated conductor 8c. Thus the lever 62, contact fingers 62f contacts 70, elements 69c and the conductors thereto connected provide two concurrently-operable voltage-dividing potentiometers that are actuated by transmitter 50s in response to variations of differential pressure sensed by diaphragm 50. The circuits of the two noted terminations connected to terminals 11 and 10. Thus a first primary electrical signal is produced at terminal set 9-8-7 which is linearly related to change of airspeed, and a second primary electrical signal is produced at terminal set 11, 12, 10 which is the electrical analog of the *mn*th power of the pressure differential sensed by diaphragm 50. Similarly, the first and second wipers or contacts comprised in the secondary transducer unit actuated by actions of diaphragm 56 and transmitter 56s, are connected to terminals 2 and 5 respectively, while linear resistance element 169c has its electrical ends connected to terminals 3 and 1 with inclusion of temperature-effect-correcting means, and non-linear element 169c' has its electrical ends connected to terminals 4 and 6 with similar inclusion of temperature-effect-correcting circuit means. Thus a first secondary electrical signal is produced at terminal set 3-2-1 which is linearly related to change of altitude, and a second secondary signal is made evident at terminal set 4-5-6 which is the electrical analog of the *mn*th exponential power of the absolute pressure sensed by diaphragm 56. The signals thus produced are voltage-ratio signals, the utilization of which is indicated in the functional block diagram in FIG. 5.

In FIG. 5, the previously-described pressure-sensitive means and associated transducer means employed to provide signals representing airspeed and the *mn*th power of the pressure-differential sensed by diaphragm 50, are denoted A1. Eelectric power is supplied as input to A1, and the first and second primary signals output therefrom are transmitted over leads L1 and L2 respectively. Lead L1 is divided and the first primary electric signal thereon is delivered to a pair of airspeed indicators of conventional, electric-meter type, 81 and 81a. the indicator 81 is effective to indicate airspeed over a lower range of airspeeds, for example 30 knots to 300 knots, while indicator 81a is effective to indicate airspeeds over a higher range thereof, from 80 knots to 800 knots, for example. The second primary signal, made apparent on lead L2 (FIG. 5) and representing the term $Qc^{mn}$ in the previously noted equation ($Qc^{.44}$ in the example here of interest), is operated upon by a multiplier circuit 84 and is thereby in effect multiplied by the noted constant $K$ which in this example is 1.06. Thus the output signal from circuit 84, on lead L2', is representative of the variable quantity (1.06 $Qc^{.44}$). That signal is input into an active operational amplifier network 86 via the lead or line L2'.

Similarly, the previously-described pressure-sensitive means including diaphragm 56 and associated transducer means employed to produce the noted secondary electric signals related to altitude and absolute pressure are indicated at A2. Electric power is input to A2, and a first secondary signal representing altitude is output on line L3 while a second secondary signal representing the *mn* th exponential function of the ambient absolute pressure $Ps$ is output on a line L4. In the selected exemplary instrumentation, *m* and *n* have values of unity and 0.44, respectively, set by instrumentation and aircraft characteristics and operating ranges. As in the case of the pressure-sensitive and transducer means in A1, the transducer resistance-element 169c' (FIG. 6) from which the signal value $Ps^{.44}$ is derived is appropriately trimmed to convert the substantially linear movement of the transmitter 56s relative to altitude, into an electrical potential varrying as the .44 power of the variation of the absolute pressure sensed by diaphragm 56.

The second secondary electric signal here denoted $Ps^{.44}$, output from A2 and appearing on line L4 (FIG. 5), is input into the noted operational amplifier network 86 in which that signal, and the second primary signal (1.06 $Qc^{.44}$) as well, are electronically subjected to a mathematical division denoted by 1.06 $Qc^{.44}/Ps^{.44}$. Thus the output from network 86, appearing on line L6, is the electrical analog of Mach number at the altitude and airspeed currently indicated by altitude indicators 82–82a and airspeed indicators 81–81a, respectively.

As in the case of the altitude indicators and airspeed indicators, it is desirable that Mach number indications be provided for low-range values and high-range values; and hence Mach number indicators 87 and 87a are connected to utilize the potential signal output on lead L6. Each indicator is effective over a respective range of Mach number values, for examples 0.2 to 0.6 low range and 0.3 to 1.1 high range. As in the cases of airspeed and altitude indicators, that indicator which is effective within the low range is ineffective over the upper portion of the range of the higher-range indicator, but provides greater accuracy or resolution within the lower range.

It will be evident to those skilled in the electrical instrumentation and resistive-devices arts that compensation for variable-temperature effects and similar sources of signal distortions may in considerable measure be effected by use of temperature-sensitive resistors characterized by positive (or negative) temperature coefficient of resistivity ($Tc$), in modes known in the art. For example, as indicated in FIG. 6, the parallel net comprising resistors R1 and R2 is connected as shown, R1 characterized by zero $Tc$, and resistor R2 being a thermistor characterized by a very high negative $Tc$ value. Similarly in the circuit of the $Ps^{.44}$ signal-generating potentiometer, resistor R3 formed of Balco wire is characterized by a positive $Tc$, and R4 made of a composition having a negative $Tc$, are connected in parallel as shown. The values are adjusted during temperature-testing of the instrument, in accord with well known modes. An exemplary mode of mounting the resistors on one or more insulation cards secured to the inner face of end cap 26, adjacent terminal header 74, is illustrated in FIG. 4. As is well known, each resistor may in practice be comprised of, or substituted by, a plurality of resistors connected in a respective resistive net. Thus the connections and resistors shown are exemplary only, and are of values dependent upon the values of the potentiometer elements and power input potentials employed. Examples of use of further optional resistors in effecting instrument adjustment and trimming are illustrated in FIG. 7, which shows two potentiometer circuits of FIG. 6, modified by potential-regulating bridging resistors shown in dotted-line form.

The preceding detailed description of the construction and operation of a preferred mode and embodiment according to the invention indicates attainment of the objects of the invention as defined in the appended claims; and further it teaches the mode and means for attaining accurate and concurrent indications of first and second variable physical quantities or variables such as altitude and airspeed, and of an extremely useful dimensionless number interrelated to those quantities or variables, without resort to third and fourth pressure-sensitive diaphragms and associated means. Thus the illustrated example of the invention provides a mode and means for deriving indications of altitude, airspeed, and Mach number, using only two pressure-sensitive devices. As is also made evident novel means comprising a specially configured diaphragm combined with a special potentiometric means are provided which sense an existing variable pressure phenomenon and in response thereto produce a mechanical signal linearly related in magnitude to a physical variable or quantity that is not linearly related to the pressure phenomenon sensed, and which novel means concurrently translates the mechanical signal into first and second electrical signals one of which is linearly related to the physical quantity and the other of which is non-linearly related by an exponential function to the variable pressure phenomenon sensed. A set of two of the noted novel means are employed in connection with operational circuit means for producing a signal representing Mach number from the two signals that are exponentially related to the respective variable pressure phenomenon sensed.

Theoretical background upon which certain aspects of the invention herein claimed are based in set out in the following publications:

1. "Tables of Airspeed, Altitude and Mach Number Based Upon Latest International Values for Atmospheric Properties and Physical Constants," authored by S. P. Livingston and Wm. Gracey; a N.A.S.A. Technical Note 822.
2. McGraw-Hill Encyclopedia of Science and Technology, Vol. I, pg. 220; Vol. III, pg. 349; Vol. VI, pg. 51; Vol. VIII, pg. 1; published by McGraw-Hill, Inc., New York City, N. Y.

The subject matter of these citations is, to whatever extent may be found to be necessary to a full understanding of the invention, incorporated in this specification by reference.

Certain disclosure related to construction of the pressure-sensitive means utilized in the instrument herein disclosed is set out in co-pending application for Letters Patent of Stephen A. Hluchan, Ser. No. 858,055, filed Sept. 15, 1959, now U.S. Pat. No. 3,625,116 which disclosure is incorporated herein by reference.

Having disclosed a single presently-preferred embodiment of the invention, we claim:

1. An instrument for concurrently producing at least one variable electric signal representing linearly the variation of a physical quantity that is non-linearly related to a sensible pressure-phenomenon adjacent the instrument and a second variable electric signal that is related by an exponential function to variation of the said pressure-phenomenon, said instrument comprising:

first means for supporting instrument components in operating functional relationship;

second means, including first and second elastic pressure-sensitive circular diaphragms each affixed at its periphery to said first means, said first and second means comprising means for subjecting each of said diaphragms to a pressure-phenomenon, each of said diaphragms comprising a large central flat portion encircled by a narrow annular corrugated portion comprising at least first and second portions of conical form integrally united at a line of juncture, each of said diaphragms constructed and arranged to elastically deform non-linearly relative to variation of respective pressure-phenomenon and linearly relative to the respective variable physical quantity that is non-linearly related to variations of said respective pressure-phenomenon;

third means, connected to said second means, for actuation thereby in response to variations of said respective pressure phenomenon, said third means comprising first and second potentiometric transducers associated with each pressure-sensitive diaphragm for translating elastic deformations of each of said diaphragms into two pairs of said first and second variable electric signals; and fourth means, connected to said third means for converting a given one of each of said pairs of electric signals together into a fifth electric signal representative of a dimensionless functional quantity.

2. The method of providing electrical analog signals related to fluid flow phenomenon, said method including the steps of:

sensing separately variations of two pressure phenomena, the first pressure phenomenon being the pressure difference between ambient static pressure and dynamic pressure and the second pressure phenomenon being absolute pressure;

producing from each of the sensed variations a variable mechanical signal the variations of which are non-linear relative to the variations of the sensed pressure phenomenon and which is substantially linear relative to concurrent variation of the variable physical quantities, airspeed and altitude, respectively;

translating each of the produced mechanical signals to first and second concurrent variable electrical signals the first of which varies linearly with variation of the respective variable physical quantity and the second of which electrical signals varies in accord with a fractional exponential function of the produced mechanical signal; and converting both of the second variable electrical signals to a fifth electrical signal representative of Mach number.

3. A device for providing electrical analog data for computation of Mach number, comprising:

a first pressure-sensitive means comprising a sealed diaphragm sensitive to differential pressure between static and dynamic air pressure variable with changing airspeed said diaphragm constructed and arranged to deform non-linearly relative to such differential pressure and to deform linearly relative to changing airspeed;

a second pressure-sensitive means comprising a second diaphragm, constructed and arranged to deform non-linearly relative to change of absolute pressure sensed and to deform linearly relative to variation of altitude;

means for producing a first electrical analog signal indicative of the deformation of said first diaphragm, said signal being proportional to the mn th exponential power of such deformation;

means for producing a second electrical analog signal indicative of the deformation of said second diaphragm, said signal being proportional to the mn th exponential power of the deformation, and means for electrically performing with said first and second signals an operation mathematically represented by the equation:

$$M = K(S_1^{mn}/S_2^{mn})$$

in which $M$ represents Mach number, $K$ is a constant, $S_1$ is the difference between static and dynamic air pressure due to movement of an object relative to the ambient air and the ambient absolute pressure of the ambient air, $S_2$ is the ambient absolute pressure of the ambient air, $m$ is a constant which in this example is equal to unity, and $n$ is a constant less than unity, so as to produce an electrical signal indicative of Mach number.

4. An instrument for producing at least one output signal that varies linearly with respect to variation of a variable physical quantity and which varies non-linearly with respect to a change in pressure sensed by pressure-sensing means in the instrument during such variation and for concurrently producing at least one output signal indicative of the dimensionless functional quantity, Mach number, said instrument comprising:
  first means for supporting instrument components in functional relationship;
  second means for sensing the physical quantity, airspeed, and producing a mechanical output indicative thereof, supported by said first means and including a pressure-sensitive means characterized by opposite pressure-sensitive surfaces and means for exposing said pressure-sensitive means to the pressure differential between ambient static pressure and dynamic pressure, said second means further comprising transmitter means connected to said pressure-sensitive means to be moved thereby, said pressure-sensitive means being constructed and arranged to move said transmitter means non-linearly with respect to variations in said pressure differential and to move linearly with respect to such variation of airspeed;
  third means, supported by said first means and connected to said second means, for translating movement of said transmitter means separately into a first primary variable electrical signal linearly indicative of variation of airspeed and a second primary variable electrical signal representing a selected non-linear mathematical function of movement of said transmitter means;
  fourth means for sensing the variable physical quantity, altitude, and producing at least one secondary variable electric signal indicative thereof; and
  fifth means electrically connected to said third means and said fourth means, for converting said second primary electric signal and said secondary electric signal into an electric signal representative of Mach number.

5. An instrument as in claim 4 wherein said fourth means is a means for sensing altitude and producing a mechanical output indicative thereof, said fourth means being supported by said first means and including a second pressure-sensitive means characterized by opposite pressure-sensitive surfaces and means for exposing said second pressure-sensitive means to the pressure differential between ambient static pressure and a reference pressure that is an extremely low pressure such as a vacuum as employed in absolute-pressure instruments, said fourth means further comprising a second transmitter means connected to said second pressure-sensitive means to be moved thereby, said second pressure-sensitive means being constructed and arranged to move said second transmitter means non-linearly with respect to variations in the aforesaid pressure differential and to move linearly with respect to variation of altitude; said third means being connected to said fourth means and including means for translating movements of said second transmitter means separately into a first secondary variable electric signal linearly indicative of the variation of altitude and a second secondary variable electric signal representing a selected non-linear mathematical function of movement of said second transmitter means and wherein said fifth means converts said second primary and second secondary electric signals into an electric signal representative of Mach number.

6. A pressure-sensitive instrument according to claim 5, in which said third means comprises two pairs of first and second potentiometer means each pair connected to one of said transmitter means in common for concurrent actuation thereby, whereby said variable electric signals are produced as electric-potential signals.

7. A pressure-sensitive instrument according to claim 5, in which each of said pressure-sensitive means comprises an integral circular diaphragm affixed at its periphery to said first means and to the center of which said respective transmitter means is affixed, each of said diaphragms comprising a large annular flat portion encircling and next adjacent to said respective transmitter means and further comprising an annular corrugated portion inside said periphery and encircling said flat portion, said corrugated portion including first and second oppositely inclined conical sections integrally joined at a circular line of juncture.

* * * * *

UNITED STATES PATENT OFFICE
CERTIFICATE OF CORRECTION

Patent No. 3,779,075    Dated December 18, 1973

Inventor(s) Stephen Andrew Hluchan and Leland B. Tainter, Jr.

It is certified that error appears in the above-identified patent and that said Letters Patent are hereby corrected as shown below:

Column 3, Line 5, "taken as indicated as indicated by" should read --taken as indicated by--.

Column 6, Line 16, "62p is a" should read --62p in a--.

Column 6, Line 25, "transducer 50s" should read --transmitter 50s--.

Column 7, Line 10, "chanber" should read --chamber--.

Column 7, Line 32, "heater" should read --header--.

Column 9, Line 29, "Eelectric" should read --Electric--.

Column 9, Line 41, "$Qc^{mm}$" should read --$Qc^{mn}$--.

Column 9, Line 66, "varrying" should read --varying--.

Column 11, Line 23, "based in" should read --based is--.

Signed and sealed this 12th day of November 1974.

(SEAL)
Attest:

McCOY M. GIBSON JR.
Attesting Officer

C. MARSHALL DANN
Commissioner of Patents